United States Patent [19]
Rapp et al.

[11] Patent Number: 4,656,969
[45] Date of Patent: Apr. 14, 1987

[54] AUTOMATIC LIVESTOCK FEEDER

[76] Inventors: Benjamin F. Rapp, 11 Apple Loop, R.R.1, Box 222, Petersburg, Ill. 62675; Gary L. Rapp, R.R. 1, Athens, Ill. 62613

[21] Appl. No.: 808,950

[22] Filed: Dec. 16, 1985

[51] Int. Cl.$^4$ .............................................. A01K 5/02
[52] U.S. Cl. ............................ 119/51.11; 119/52 AF; 119/51.5
[58] Field of Search ............. 119/51.11, 52 AF, 51.5; 340/621

[56] References Cited

U.S. PATENT DOCUMENTS

| | | | |
|---|---|---|---|
| 2,987,040 | 6/1961 | Piel | 119/52 AF |
| 3,256,861 | 6/1966 | Giltner | 119/51.11 |
| 3,561,403 | 2/1971 | Wilson et al. | 119/51.11 |
| 3,800,746 | 4/1974 | Stidham | 119/56 R |
| 4,000,719 | 1/1977 | Richards | 119/51.13 |
| 4,051,812 | 10/1977 | DeLoach et al. | 119/51.11 |
| 4,131,082 | 12/1978 | Sollars | 119/51.5 |
| 4,248,087 | 2/1981 | Dennis et al. | 340/621 |
| 4,502,416 | 3/1985 | Keysell et al. | 119/51.11 |

Primary Examiner—Hugh R. Chamblee
Attorney, Agent, or Firm—Marshall, O'Toole, Gerstein, Murray & Bicknell

[57] ABSTRACT

An automatic livestock feeding apparatus having a hopper, a trough, a distributor for transferring feed from the hopper to the trough, and a feed level sensing device. The feed level sensing device includes apparatus for inducing vibration of the trough when the amount of feed present in the trough falls below a predetermined level. The sensing device further includes apparatus for detecting the vibration, thus indicating a low feed level condition. The feeding apparatus also includes a distributor control device which is responsive to the low level feed condition indicated by the feed level sensing device, and which activates other apparatus to cause the trough to be replenished with either a dry feed or liquid feed mixture. A counter display may included as part of the feeding apparatus to indicate the number of times the trough has been replenished. Additional control apparatus may be included to limit trough replenishing where ration feeding is desired.

13 Claims, 6 Drawing Figures

AUTOMATIC LIVESTOCK FEEDER

BACKGROUND OF THE INVENTION

The present invention relates generally to livestock feeding apparatus and more particularly to a livestock feeding apparatus which automatically senses when the feed has been consumed from the apparatus and which controls the manner in which the feed is replenished to the apparatus.

Automatic livestock feeders are not new. For example, Richards U.S. Pat. No. 4,000,719 and Stidham U.S. Pat. No. 3,800,746 disclose automatic feeders which will dispense feed at predetermined time intervals. These devices, however, have no means for sensing the level of feed available for consumption at any given time. Automatic feeders with such sensing devices are disclosed in Keysell et al. U.S. Pat. No. 4,502,416, Sollars U.S. Pat. No. 4,131,082, Wilson et al. U.S. Pat. No. 3,561,403, and Piel U.S. Pat. No. 2,987,040. These devices, however, typically utilize sensing probes or switches which are susceptible to contamination or false readings caused by an accumulation of the feed in the area of the probe or switch.

SUMMARY OF THE INVENTION

This invention relates to an automatic livestock feeding apparatus comprising novel means for sensing when the amount of feed in the feeder has been consumed past a predetermined level and for controlling the manner in which the feeder is replenished with feed.

The feed sensing means of the invention utilizes the principle that as the level of feed in the feed trough of the device decreases, the trough has a greater tendency to vibrate or resonate in response to external excitation of a particular intensity. Stated another way, as the level of feed in the feed trough decreases, the feed is less likely to dampen out an induced vibration of the trough. The present invention comprises feed level sensing apparatus which includes means for inducing vibration of the feed trough of the apparatus when the feed in the trough has been consumed past a certain predetermined level. The sensing apparatus further includes means for detecting the induced vibration, thus indicating a low feed level condition of the trough.

The present invention also comprises a control means which is responsive to the low feed level condition indicated by the feed level sensor and which activates other apparatus to cause the feed trough to be replenished with either a dry feed or a liquid feed mixture.

In one embodiment of the invention, the aforesaid control means also activates apparatus which displays the occurrences of replenishing for record keeping purposes.

In still another embodiment of the invention, the aforesaid control means also activates additional apparatus which limits the number of occurrences of replenishing or which limits the rate of replenishing where ration feeding is desired.

The present invention offers advantages over the time-controlled devices shown in the prior art because the feed is automatically replenished on an "as needed" basis. Thus, fresh feed will be available to the feeding livestock at all times. The feed sensing apparatus of the present invention also advantageous over the sensing apparatus shown in the prior art. For example, the sensing apparatus of the invention is much less susceptible to contamination. In addition, feed anywhere in the trough is sensed, so that a localized accumulation of feed will not result in a false reading. Further, the present invention incorporates additional features which allow the operator to monitor the feeding habits of the livestock or to control the feeding in a flexible manner.

Other features and advantages are inherent in the apparatus claimed and disclosed or will become apparent to those skilled in the art from the following detailed description in conjunction with the accompanying drawings.

DETAILED DESCRIPTION

Figure 1:
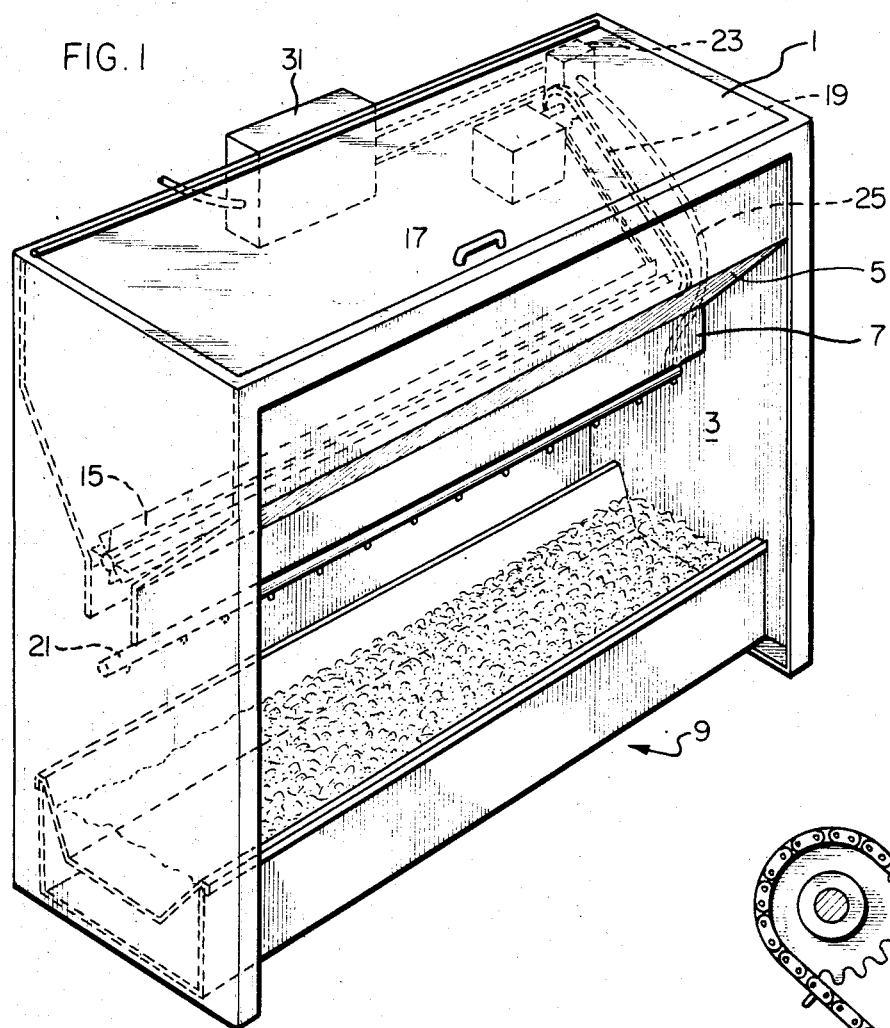
FIG. 1 is a perspective view of the apparatus comprising an embodiment of the present invention.

As shown in FIG. 1, the automatic feed dispensing apparatus of the present invention includes, as is typical of livestock feeders, a feed hopper 5 and, located beneath hopper 5, a feed trough 9. Hopper 5 and trough 9 are mounted at each end to the feeder vertical side panels 3.

Hopper 5 is of a "V"-shaped configuration and is open at both its wide upper portion and at the base of the "V" where it terminates into a narrow hopper drop portion 7. A hinged hopper cover 1 is mounted to the top of hopper 5.

To prevent an uncontrolled transfer of feed from the hopper 5 to trough 9, a rotatable, vaned distributor 15 extends the length of hopper 5 within the narrow hopper drop portion 7. Distributor 15 is constructed such that the vanes on the distributor will prevent feed from passing from hopper 5 through hopper drop 7 until the distributor is caused to rotate. To facilitate such rotation, distributor 15 is coupled to a drive motor 17 through a drive chain 19. When drive motor 17 is operated, it causes distributor 15 to rotate, which in turn causes a transfer of feed from hopper 5 to trough 9. Drive motor 17 is connected to an external 120 volt a-c power source through a control relay 55 as described below in connection with FIG. 4.

Located slightly beneath the bottom of hopper drop 7 is a water manifold 21 which extends along the length of hopper 5. Water is supplied to water manifold 21 by a water hose 25. The water into hose 25 is regulated by a normally-closed solenoid valve 23 which is connected between the hose and an external water source (not shown). When solenoid valve 23 is opened, water will flow into water manifold 21. Water manifold 21 is constructed so as to direct the water flowing into the manifold onto the feed transferred from hopper 5 to trough 9 to create a water-feed mixture in the trough. Solenoid valve 23 is connected to an external 120 volt a-c power source through a control relay 55 as described below in connection with FIG. 4. Of course, if such a liquid feed mixture is not desired, water manifold 21, solenoid 23 and hose 25 may be eliminated or otherwise disconnected from the apparatus.

Figure 2:
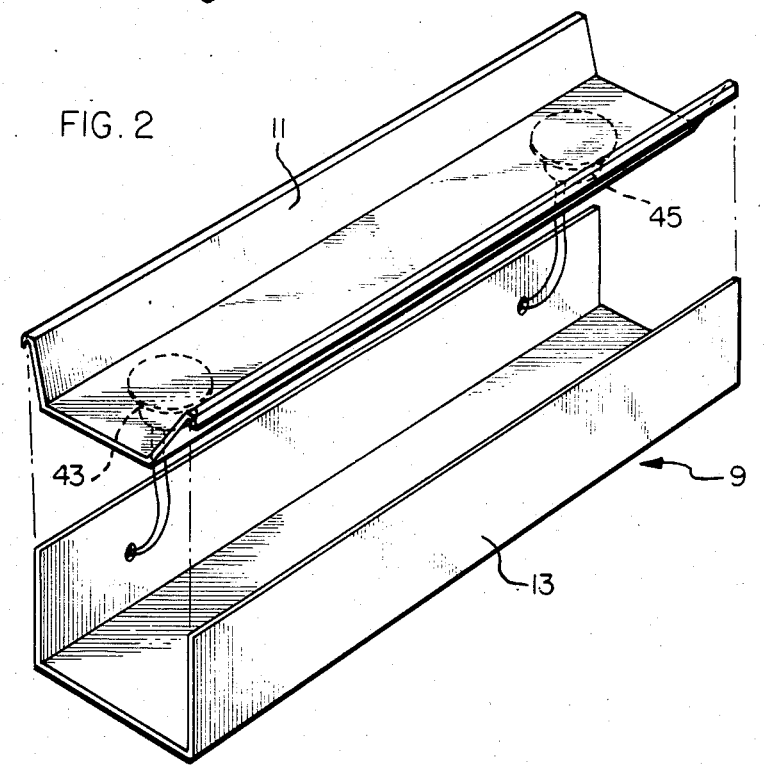
FIG. 2 is a detailed view of part of the apparatus shown in FIG. 1.

As shown in detail in FIG. 2, trough 9 is comprised of a trough pan 11, extendin9 the length of the trough, and a trough housing 13 which is attached to the bottom of pan 11. Pan 11 is of an ordinary trough-like configuration such that it will contain the feed in the trough while permitting access to the feed by the feeding livestock. Because it is necessary to the operation of the feed sensing apparatus of the invention that pan 11 be susceptible to induced vibration, as described below, it is desirable that pan 11 be constructed from a material that is highly resonant, such as metal. Pan 11 can be constructed from a less highly resonant material, such as fiberglass or concrete, however.

An input transducer comprised of an 8 ohm high impedance loudspeaker 43 is mounted with its cone facing upward to the bottom surface of pan 11 near one end of the pan. Loudspeaker 43 is affixed to the pan using a liquid foam adhesive. An output transducer comprised of an 8 ohm high impedance loudspeaker 45 is mounted in a similar fashion to the bottom surface of pan 11 near the opposite end of the pan. The size of the loudspeakers will depend on the size and construction of the trough. For example, 6 inch diameter loudspeakers have been found suitable for use with a 16 gage steel trough which is 8 inches wide at its bottom surface. Trough housing 13, mounted to the bottom of trough 9, is configured to cover the loudspeakers to protect them from the weather and from the feeding livestock.

Although loudspeakers are described as the input and output transducers in this instance, many other devices could be utilized. For example, the input transducer could comprise most any device that generates a signal in response to a sensed vibration of the trough, such as a proximity probe. And, for example, the output transducer could comprise most any device which, in response to a signal, has a tendency to induce the trough to vibrate, such as an electromechanical exciter.

Figure 4:
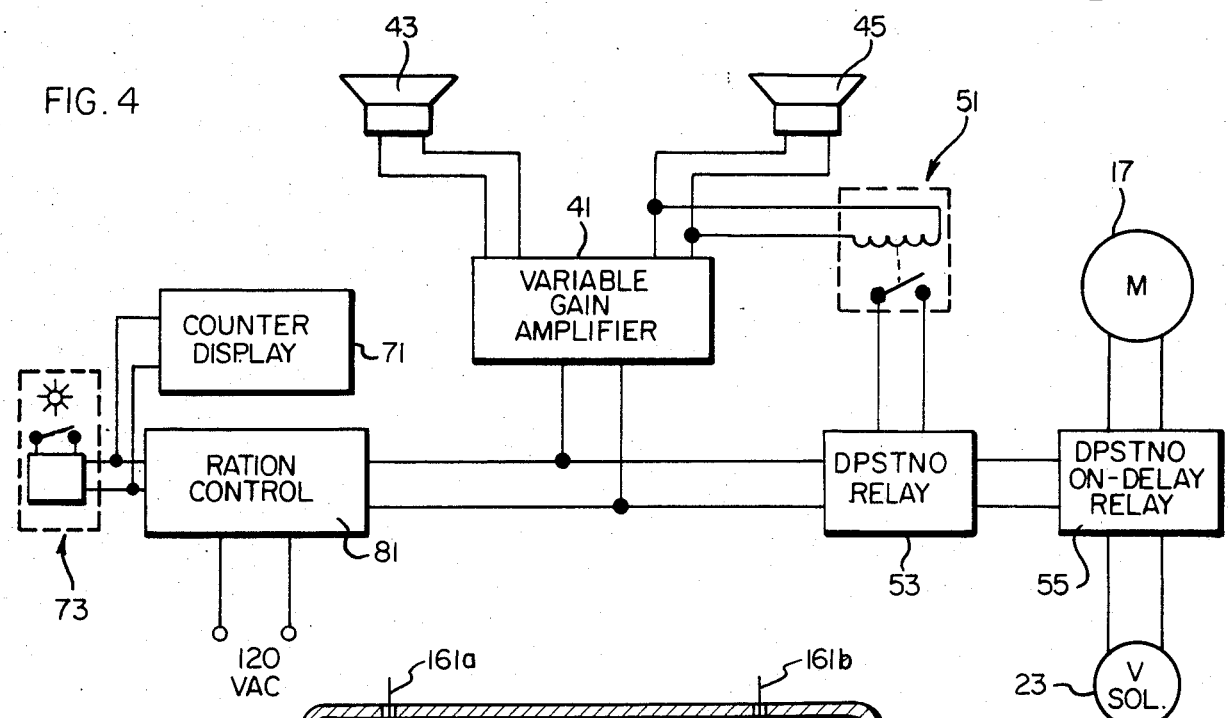
FIG. 4 is an electrical system schematic diagram of the sensing and control apparatus of the present invention.

Referring now to the schematic diagram of FIG. 4, input loudspeaker 43 is connected to the input of an amplifier 41. Output loudspeaker 45 is connected to the output of amplifier 41. Amplifier 41 can be an ordinary audio amplifier with sufficient gain to cause the loudspeakers to induce the trough to the desired level of vibration. For example, a 1 watt amplifier has been found suitable for use with the 6 inch loudspeakers and trough as described above. The power circuitry of amplifier 41 is connected to a connected to an external 120 volt a-c power source (not shown). Preferrably, amplifier 41 is also of the type which includes a variable gain or "volume" control.

The output of amplifier 41 is additionally connected to the energizing circuit of a normally-open relay 51. Relay 51 is of the type having rated coil voltage which will maintain an open contact circuit until the output from amplifier 41 reaches a predetermined level, at which time the contact circuit will close. For example, it has been found that a relay having a rated coil voltage of 0.5 volts is suitable for use with the 1 watt amplifier described above.

Figure 6:
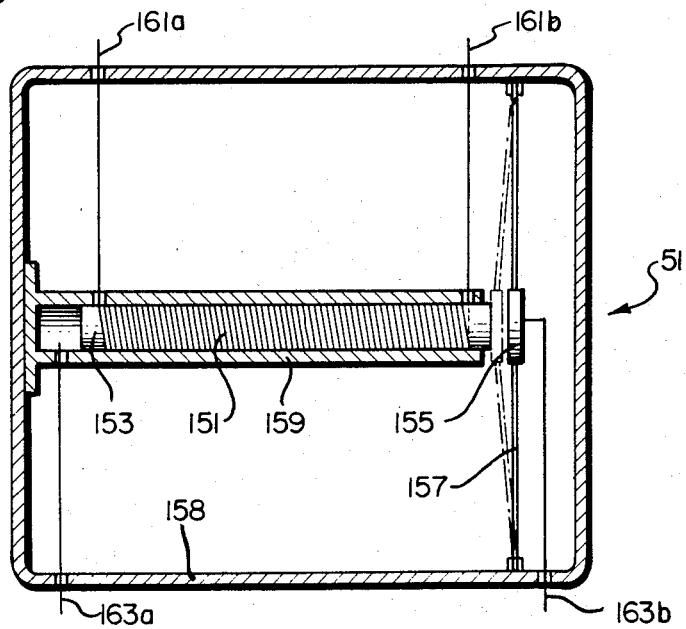
FIG. 6 is a detailed view of part of the apparatus shown in schematic form in FIG. 4.

A detailed view of an embodiment of a suitable relay 51 is shown in FIG. 6. In this embodiment, relay 51 is comprised of a coil of varnished wire 151, 25 feet in length, wound around an insulated ¼ inch steel rod 153. The wound rod is held in place by inserting it snugly into a plastic tube 159, which is in turn attached to housing 158. A steel conducting piece 155, attached to a rubber band 157 midway along its length, is suspended 1/32 inches away from steel rod 153. Relay 51 is energized through wires 161a and 161b, which, when energized with approximately 0.5 volts, will cause conducting piece 155 to be magnetically attracted to steel rod 153. The contact circuit will then close, completing the circuit through wires 163a and 163b.

The contact circuit of relay 51 is connected to the control switch of a double-pole single-throw normally-open (DPSTNO) relay 53, such that when the contact circuit of relay 51 closes, the contacts of relay 53 will close as well. A commercially available relay found suitable for this application is Dayton Electric Manufacturing Co. Relay Model 6X153C.

The contact circuit of relay 53 is connected between an external 120 volt a-c power source and the energizing circuit of a double-pole single-throw normally-open (DPSTNO) on-delay relay 55. On-delay relay 55 is of the type which will not immediately close when off-delay relay 53 closes, but which will close only if off-delay relay 53 remains closed for a period of time determined by the delay. A suitable delay for this particular embodiment of the invention has been found to be approximately 1.5 seconds, the purpose of which is discussed in greater detail in the "operation" section of the specification. A commercially available relay found suitable for this application is Dayton Electric Manufacturing Co. Relay Model 5X828C.

Although relays 51, 53 and 55 have been described above with particularity, it should be understood that any device having the desired functional attributes of a particular relay could be substituted therefor.

The contact circuit of on-delay relay 55 is connected between an external 120 volt a-c power source and the energizing circuit of distributor motor 17 and, if included in the apparatus, to the energizing circuit of water input solenoid valve 23. The connection is such that when the on-delay relay 55 switches to its closed position, power will be connected to distributor motor 17 to operate distributor 15 and to solenoid valve 23 to cause it to open and permit water to flow through water manifold 21.

If desired, a counter display 71 can be included in the apparatus of the invention. Counter display 71 is of the type which will display a numerical count of the number of times that the counter has been energized. Counter display 71 is connected to an 120 volt a-c power source, and is energized by the closing of a micro-switch 73.

Figure 5:
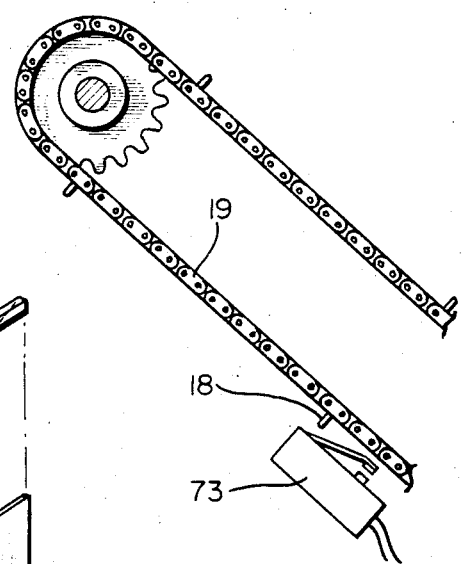
FIG. 5 is a detailed view of part of the apparatus shown in schematic form in FIG. 4.

As shown in detail in FIG. 5, micro-switch 73 is located adjacent to distributor drive chain 19. Chain 19 includes tabs 18 extending from the links of the chain at predetermined intervals. When distributor drive motor 17 is operated, tabs 18 will pass by and trip micro-switch 73, thus energizing counter display 71. Depending on the particular spacing of tabs 18, and the particular construction of the feeder and distributor, the numerical count registered on counter display 71 can be correlated to a certain amount of feed that has been transferred from the hopper to the trough. Such a count provides useful information to the operator of the apparatus regarding the consumption of feed by the feeding livestock.

Further, if desired, a ration feeding control 81 can also be included in the apparatus of the invention. Ration control 81 is of the type which will keep a count of the number of times that the device has been energized, and which will use the count in controlling other circuitry. More particularly, ration control 81 is connected to an external 120 volt a-c power source, and microswitch 73 is used to energize ration control 81, as described above in regard to counter display 71. The control circuitry of ration control 81 is connected between the external power source and the power circuit of amplifier 41 and the energizing circuit of relay 53. Thus, ration control 81 acts as a "master" switch between external power and the other components of the feed sensing and feed distribution control circuitry, and controls the feed replenishing process independently of the feed sensing apparatus.

Depending on how the operator configures ration control 81, control 81 could be used to cut-off power to amplifier 41 and relay 53 to prevent further replenishing operations once the trough has been replenished a predetermined number of times. Alternatively, control device 81 could be configured to cut-off power to amplifier 41 and relay 53 to prevent further replenishing once the trough has been replenished a given number of times within a certain period of time (thus controlling the rate of replenishing).

As shown in FIG. 1, a housing 31 is attached to the feeder. Housing 31 contains amplifier 41, relays 51, 55 and 55, counter display 71, and counter control 81. Wires extend from housing 31 to connect loudspeakers 43 and 45, motor 17 and solenoid valve 23 to the components contained within housing 31 as described in connection with FIG. 4. In addition, wires from an external 120 volt a-c power source are extended into housing 31 to provide power to the various components, also as described in connection with FIG. 4.

Operation

Figure 3:
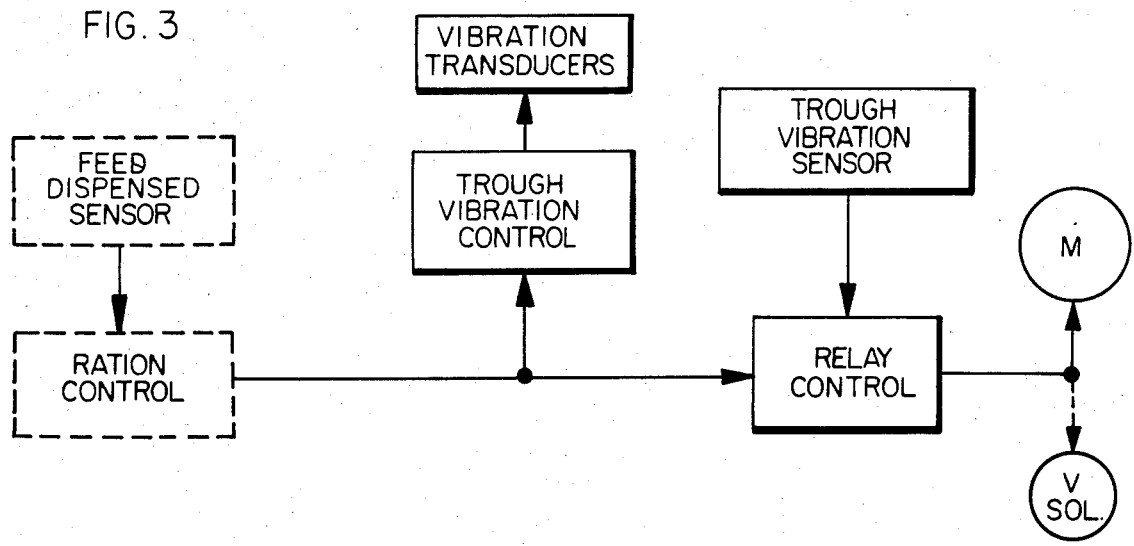
FIG. 3 is a flow diagram of the sensing and control apparatus of the present invention.

A flow diagram indicating the basic function and interaction of the components of the present invention is shown in FIG. 3.

Assuming that external power is connected to the apparatus of the invention as described above, and that hopper 5 contains feed, the feed sensing apparatus of the invention is activated by powering on amplifier 41 and adjusting its gain control until the empty trough 9 begins to vibrate or resonate. This vibration or resonation occurs by virtue of sonic feedback which circulates between input loudspeaker 43, amplifier 41, and output loudspeaker 45. The feedback starts when input loudspeaker 43 picks up extraneous noise from the trough, which is amplified by amplifier 41, which is output by loudspeaker 45 to the trough, which is in turn picked up by input loudspeaker 43 and so on until the feedback reaches a definite, sustained amplitude level causing the empty trough to vibrate.

When the aforesaid sustained amplitude is reached, the output from amplifier 41 will be sufficient to cause relay 51 to be energized. When relay 51 is energized, its contact circuit will close.

When the contact circuit of relay 51 closes, the contact circuit of relay 53 also closes. In turn, closed relay 53 connects the 120 volt a-c power source to the energizing circuit of on-delay relay 55. The contact circuit of relay 55, by virtue of its delay feature, will not close immediately, however. Relay 55 will only close if relay 53 remains closed for the entire delay period. The delay is important because it is desirable to filter out extraneous noises emanating from the trough which are not indicative of a true sustained vibration. If such a sustained vibration is in fact present, relay 53 will remain closed long enough to cause on-delay relay 55 to close. It has been found that a 1.5 second delay on relay 55 is adequate to provide the desired noise filtering.

When relay 55 closes, it connects the 120 volt a-c power source to distributor drive motor 17 and to water solenoid valve 23. Thus, drive motor 17 causes distributor 15 to turn, which causes a transfer of feed from hopper 5 to trough 7. At the same time, solenoid valve 23 opens, causing water to flow through water manifold 21 and onto the feed being transferred to create a liquid feed mixture in the trough.

As the feed transfer process continues, the amount of feed in trough 9 will increase until it is sufficient to dampen out the sustained vibration in the trough. It has been found that the vibration will decay over a period of time sufficient to allow the trough to be adequately replenished with feed.

When the vibration in the trough is dampened out by the feed, little or no voltage will be output from amplifier 41 to relay 51. As a consequence, relay 51 will open, causing relays 53 and 55 to open, which in turn cuts off power to distributor drive motor 17 and solenoid valve 23. At this point, the transfer of feed from hopper 5 to trough 7 ceases.

As the feeding livestock consume the feed, trough 9 once again becomes increasingly susceptible to induced vibration. It has been found that the gain control on amplifier 41 can be adjusted to induce the required vibration for indicating a low feed level condition at a point when the feed is nearly completely consumed from the trough. Once the feed in trough 9 is consumed past this point, the vibration starts up, and the feed replenishing process is commenced once again.

Although the sensing apparatus of the present invention has been described as a feed level sensor on a livestock feeder, it should be understood that the sensing apparatus of the invention could be easily adapted to sense the level of various other materials in connection with apparatus other than livestock feeders. In the general case, the apparatus would comprise a sensing apparatus operatively associated with apparatus for holding the material whose level is to be sensed. Similar to that described above, the sensing apparatus would include means for inducing vibration of the material holding apparatus when the amount of material in the holding apparatus is less than a predetermined level. The sensing apparatus would further include means for detecting the induced vibration, and control means responsive to the vibration detecting means. The aforesaid control means could be simply an indicator, such as a light or bell, for visually or audibly signalling a low level condition of the material. Where automatic operation of additional apparatus is desired in response to the low level condition, a more sophisticated control means would be employed to activate this additional apparatus.

The foregoing detailed description has been given for clearness of understanding only, and no unnecessary limitations should be understood therefrom, as modifications will be obvious to those skilled in the art.

We claim:

1. An automatic livestock feeding apparatus comprising:
    a hopper means;
    a trough means;
    a distribution means for transferring feed from said hopper means to said trough means;
    a feed level sensing means comprising (a) means for inducing sustained vibration of said trough means only when an amount of feed present in said trough means is less than a predetermined level and (b) means for detecting said sustained vibration to indicate that said amount of feed is below said predetermined level; and a distribution means control means responsive to said feed level sensing means for activating said distribution means.

2. The apparatus of claim 1 wherein:

said distribution control means comprises a first relay means and a second relay means;

said first relay means comprising means responsive to said feed level sensing means; and said second relay means comprising means responsive to said first relay means for activating said distribution means.

3. The apparatus of claim 1 further including:

a counter display means responsive to said operation of said distribution means.

4. The apparatus of claim 1 further including:

a ration feeding control means responsive to said operation of said distribution means;

said ration feeding control means comprising means for preventing further operation of said distribution means in response to a predetermined number of prior operations of said distribution means.

5. The apparatus of claim 1 further including:

a ration feeding control means responsive to said operation of said distribution means;

said ration feeding control means comprising means for controlling the frequency of operation of said distribution means independently of the state of said feed level sensing means.

6. The apparatus of claim 1 wherein said means for inducing vibration comprises:

a signal amplifier means comprising a signal input and a signal output stage;

an input transducer means, operatively connected to said input stage of said amplifier means, for producing a signal responsive to vibration of said trough means; and an output transducer means, operatively connected to said output stage of said amplifier means, for transmitting said signal in amplified form to said trough means to induce vibration of said trough means.

7. The apparatus of claim 6 wherein:

said amplifier means comprises a variable gain control means.

8. The apparatus of claim 6 wherein:

at least one of said transducer means comprises a loudspeaker.

9. The apparatus of claim 6 wherein:

said vibration detecting means comprises a relay means operatively connected to said output of said amplifier means.

10. The apparatus of claim 1 wherein:

said distribution control means comprises a relay means operatively connected to said distribution means and responsive to said feed level sensing means.

11. The apparatus of claim 10 wherein:

said relay means further included means for filtering false signals from said feed level sensing means.

12. An automatic livestock feeding apparatus comprising:

a hopper means;

a trough means;

a distribution means for transferring feed from said hopper means to said trough means;

a liquid inlet means for directing liquid into said trough means;

a feed level sensing means comprising (a) means for inducing sustained vibration of said trough means only when an amount of feed present in said trough means is less than a predetermined level and (b) means for detecting said sustained vibration to indicate that said amount of feed is below said predetermined level;

a distribution means control means responsive to said feed level sensing means for activating said distribution means; and a liquid inlet control means responsive to said feed level sensing means for activating said liquid inlet means.

13. An automatic material level detecting apparatus comprising:

a material holding means;

a material level sensing means, operatively associated with said material holding means, comprising (a) means for inducing sustained vibration of said material holding means only when the amount of material in said holding means is less than a predetermined level and (b) means for detecting said sustained vibration to indicate that said amount of material is below said predetermined level; and control means responsive to said material level sensing means for activating other apparatus.

* * * * *